US008350204B2

(12) United States Patent  (10) Patent No.: US 8,350,204 B2
Moser  (45) Date of Patent: Jan. 8, 2013

(54) LIGHT SOURCE TRACKER

(76) Inventor: Mark Moser, Manhattan, KS (US)

(*) Notice: Subject to any disclaimer, the term of this patent is extended or adjusted under 35 U.S.C. 154(b) by 359 days.

(21) Appl. No.: 12/836,273

(22) Filed: Jul. 14, 2010

(65) Prior Publication Data

US 2011/0163222 A1 Jul. 7, 2011

Related U.S. Application Data

(63) Continuation-in-part of application No. 12/808,120, filed as application No. PCT/US2008/086148 on Dec. 10, 2008, now Pat. No. 8,017,895.

(60) Provisional application No. 60/013,003, filed on Dec. 12, 2007.

(51) Int. Cl.
*G01C 21/02* (2006.01)
(52) U.S. Cl. .................................................. 250/203.4
(58) Field of Classification Search ............... 250/203.3, 250/203.4
See application file for complete search history.

(56) References Cited

U.S. PATENT DOCUMENTS

| 3,917,942 | A | 11/1975 | McCay |
| 3,967,387 | A | 7/1976 | Marchegiani |
| 4,063,543 | A | 12/1977 | Hedger |
| 4,082,947 | A | 4/1978 | Haywood et al. |
| 4,190,766 | A | 2/1980 | Young |
| 4,245,153 | A | 1/1981 | Porter |
| 5,671,035 | A | 9/1997 | Barnes |
| 6,946,858 | B2 * | 9/2005 | Matsuyama ............ 324/761.01 |
| 6,959,269 | B1 | 10/2005 | Welterlen |
| 7,003,402 | B2 | 2/2006 | Christie et al. |
| 7,202,457 | B2 | 4/2007 | Janus et al. |
| 2007/0152143 | A1 | 7/2007 | Koster |
| 2007/0222252 | A1 | 9/2007 | Suzuki et al. |
| 2009/0050191 | A1 | 2/2009 | Young et al. |
| 2009/0314279 | A1 | 12/2009 | Karim et al. |

FOREIGN PATENT DOCUMENTS

| WO | WO 2009/031726 | 3/2009 |
| WO | WO 2009/076394 | 6/2009 |

* cited by examiner

*Primary Examiner* — Thanh Luu
(74) *Attorney, Agent, or Firm* — Greer, Burns & Crain, Ltd.

(57) ABSTRACT

A tracking device for automatically following a moving light source that is detectable in the presence of ambient light. A carrier platform including one or more radiant energy conversion devices and a sensor array is mounted to an upright support column with a universal joint. Three linear actuators, each having an associated light sensor, are equally angularly spaced about the support column with an upper end connected to the carrier platform with a universal hinge and a lower end connected to a floating base with a spherical hinge. The floating base is free to move axially but not radially of the support column. The actuator of a light sensor receiving a lesser amount of radiant energy retracts, and extends when receiving a greater amount of radiant energy. Each light sensor is moved in a stepwise manner, with a predetermined, limited number of steps used to define light source acquisition for tracking purposes.

8 Claims, 13 Drawing Sheets

| ORIENTATION | SENSOR ARRAY, λ (ON = SENSOR IS ON) | | | ACTUATOR #1 | | ACTUATOR #2 | | ACTUATOR #3 | | WHEN ACTUATOR CONTROLS ARE ENERGIZED |
|---|---|---|---|---|---|---|---|---|---|---|
| | $\lambda_1$ | $\lambda_2$ | $\lambda_3$ | EXTEND | RETRACT | EXTEND | RETRACT | EXTEND | RETRACT | RESULTING ACTIVITIES |
| 1 | | | | | YES | | YES | | YES | ALL THREE ACTUATORS RETRACT |
| 2 | | | ON | | YES | | YES | YES | | ACTUATORS 1 & 2 RETRACT, ACTUATOR 3 EXTENDS |
| 3 | | ON | | | YES | YES | | | YES | ACTUATORS 1 & 3 RETRACT, ACTUATOR 2 EXTENDS |
| 4 | | ON | ON | | YES | YES | | YES | | ACTUATOR 1 RETRACTS, ACTUATORS 2 & 3 EXTEND |
| 5 | ON | | | YES | | | YES | | YES | ACTUATORS 2 & 3 RETRACT, ACTUATOR 1 EXTENDS |
| 6 | ON | | ON | YES | | | YES | YES | | ACTUATOR 2 RETRACTS, ACTUATORS 1 & 3 EXTEND |
| 7 | ON | ON | | YES | | YES | | | YES | ACTUATOR 3 RETRACTS, ACTUATORS 1 & 2 EXTEND |
| 8 | ON | ON | ON | ALL STOP (TARGET SENSOR IS ILLUMINATED, $\lambda_T$) | | | | | | CENTRAL TARGET SENSOR ILLUMINATED AND SIGNALS THE ALL STOP |

FIG. 8

LIGHT SOURCE TRACKER

RELATED APPLICATION

This application claims priority of U.S. Provisional Application No. 60/013,003 entitled "POINT LIGHT TRACKER" filed Dec. 12, 2007, PCT/US2008/086148 filed Dec. 10, 2008 and U.S. patent application Ser. No. 12/808,120 filed Jun. 14, 2010.

FIELD OF THE INVENTION

The present invention relates to tracking devices, and more particularly, it relates to a device which automatically maintains a specific orientation to a moving light source such as the sun. The present invention is described in the context of a solar tracker although the physical structure and associated electronic control circuit have a broader application than solar tracking devices. As used herein, a "light source" or "point light source" refers to a source of light which emits radiant energy which is detectably greater in intensity than is ambient light. Ambient light is all incident light at a location, particularly all reflected light.

BACKGROUND OF THE INVENTION

In the current environment of significant human power needs, solar energy will necessarily provide a significant contribution. One such need is a requirement for the conversion of solar radiation into a useable form of energy such as electrical or heat concentration using solar cells, for example. However, a problem lies in the capability of such devices to track the sun continuously and economically in all locations of interest and possible use, and under varying external conditions, such as weather.

Many devices are currently available that include a solar panel mounted for movement including one or two axes of rotation. There are devices which have a vertical axis of rotation managed by a turret mechanism. Many devices utilize sensors to locate the desired light source. Other devices use heated fluids to drive the rotational movement about an axis. However, devices that rotate about only one or two axes, are limited in scope. They typically have a control system with a large array of sensors to determine the position of the desired light source and a sophisticated electronic control system. These systems generally have a significantly complex or heavy frame and support structure with a multitude of components. Turret devices require motors, gear mechanisms, chains, and bearings that can withstand heavy loads. Most require setup that includes orientation sensitive to the tracked light source trajectory. Many tracking systems that are considered "automatic" require some sort of programming to complete the tracking sequence that appears automatic. Regardless of the control system configuration, periodic repositioning or reprogramming is required.

SUMMARY

The tracker of the present invention includes a single support column fixed or grounded at the lower end to the earth and having a universal joint at the upper end connecting to the center of a carrier platform on which a payload, such as solar panels are mounted. The universal joint permits bi-axial rotation along two orthogonal axes extending generally parallel to the carrier platform. The carrier platform does not rotate about the third orthogonal axis, which is collinear with the longitudinal axis of the column. The carrier platform including energy conversion devices (e.g. solar cells) and a light source tracking array is mounted on top of the column for rotational movement about two orthogonal horizontal axes so that the platform can be positioned to face any angle from near the horizon to the Zenith and be positioned 360 degrees around the axis of the support column (the "support axis"). In one embodiment, the axis of the support column intersects with the zenith (i.e., the point of the celestial sphere directly above the unit).

The orientation of the carrier platform is preferably maintained by three linear actuators, each having one end (the upper end) mounted to the carrier platform by a spherical hinge, and the opposing or lower end mounted to a floating base received on the support column for free sliding motion along the support axis. The lower end of the actuators (which are equally spaced apart) are moveably mounted but fixed to the floating base. The floating base, confined to motion along the longitudinal axis by the support column (but freely movable along the longitudinal axis of the support column) secures the lower end of the linear actuators by rotating joints equally angularly spaced around the support axis. The floating base is guided by and slides freely along the axis of the support column and maintains the mounting joints of the base of the actuators in a fixed relationship to one another and to the support axis. The mounts for the lower ends of the linear actuators are pinned to the floating base but able to rotate a limited amount in all directions. If screw-type linear actuators are used, the lower end of each actuator is constrained from rotating about its longitudinal axis as in the illustrated embodiment because limited rotary motion about the axis of extension of these actuators is permitted due to their structure. The floating base may also provide support and an enclosure for an electronic control module for the controller.

The upper ends of the linear actuators are mounted to the bottom of the carrier platform by an inexpensive joint which allows for rotation in all three axes at each linear actuator joint. It can also be described as a spherical joint, rotatable in all directions over a limited but substantial range. The linear actuator joints are fixed to the carrier platform and are located at equal angular spacing about, and equal distance from the support axis which intersects with the center of the carrier platform and is radially placed on a plane normal to the support. The center of the carrier platform is joined by a universal joint to the top of the support column.

In operation, each linear actuator defines the distance between the associated mount of that actuator to the floating base and the associated upper hinge mounted to the carrier platform. When the linear actuators are fixed in length, the orientation of the upper platform is defined. The plane of the upper platform may thus be adjusted (by independently adjusting the length of the actuators) to a position normal to incident direct light over substantially a complete hemisphere, thus enabling the carrier platform to track the sun from sunrise to sunset at substantially all locations on earth. This is achieved by using a minimum of three mounting points on the carrier platform and location of the carrier platform with respect to the support axis. The ability of the floating base to move axially along the support column accommodates the changes in the effective length of the support column between the carrier platform and the supporting carrier base as the adjusted lengths of the actuators change to accommodate the continuous range of orientations of the carrier platform necessary for the carrier platform to view all positions in the hemisphere. It will be appreciated that the actuators vary in length continuously and independently of one another during operation.

On top of the carrier platform are affixed a payload device including conventional energy conversion modules, if desired, and one control sensor array which monitors the spatial location of the desired point light source (typically the sun) and controls the movement of the linear actuators to position the carrier platform to "face" the sun. By this it is meant that an imaginary line (referred to as the sight axis) which is perpendicular to the carrier platform, intersects both the carrier platform (preferably at the center) and the targeted light source. The sensor array includes three primary sensors (which detect direct illumination) and three ambient light sensors, one associated with each primary sensor. An opaque blinder partially isolates the primary sensors from one another so that their respective fields of view are equal in scope but isolated from the other primary source sensors in such a manner that when all three primary sensors indicate they are facing the source, the carrier platform also faces the source (or sun).

In the disclosed control sensor array there are three sectors comprising the 360 degree field about the center of the sight axis. Each primary sensor is associated with an ambient sensor in such a manner that when a primary sensor generates a signal substantially greater than the associated ambient sensor, it is taken as an indication that that particular primary sensor is receiving solar radiation directly (i.e. it "sees" the "sun"). When the source illuminates a primary sensor a signal is sent to the controller which in turn, reverses the current flow to the associated linear actuator. One end of each actuator (referred to as the base) is mounted to the floating base and the other end of the actuator (the rod end) is mounted to the carrier panel at a location opposite to its associated sensor array. Thus, when a sensor array generates a signal that its sector is receiving incident sunlight over its associated blinder, the controller reverses the action of the associated linear actuator. Thus, each array is moved repeatedly between a "blind" position and a "sighting" position.

A fourth primary sensor (the "target acquired" sensor) is positioned in an elongated recess which extends parallel to the sight axis so that when it detects incident sunlight, it indicates that all three primary sensors are detecting incident sunlight simultaneously, so that the payload or solar cell panel is also facing the sun in a position normal to the sight axis. Each linear actuator has a similar relationship to its sensor pair (i.e. one primary and one ambient sensor). The controller reacts instantly to the signals sent by the primary sensors for extending or retracting the linear actuators and the "target acquired" sensor generates a signal, when illuminated directly to stops all linear actuators. When the sun thereafter moves to a position at which any primary sensor no longer directly detects the sun, the process repeats itself to maximize the amount of time during the sun's availability in which the payload sights the source by being positioned in a plane perpendicular to the sight axis when it is directed to the light source.

Each linear actuator is, during the duty cycle, either extending or retracting, simultaneously and independently of the other actuators. The primary sensor's signal of the presence or absence of the sun determines whether or not a particular actuator retracts and extends. When a primary sensor detects illumination, it actuates its associated actuator to extend, and when the sensor does not detect incident light energy, it sends a signal to its associated linear actuator to retract. The physical orientation of an actuator in the apparatus and with respect to an associated sensor causes the actuator to extend in the presence of light and thus orient the carrier platform toward the source of light, causing the platform to move generally toward the source.

The electronic controller includes a plurality of timers that manage the user required timed sequences of activity of the tracker, the 'target acquired' or all-stop circuit, and the optional ambient light system enable circuit. The first timer considered manages or initiates the Sleep Cycle (i.e., when no light source can be detected by all three control sensors). The Sleep Cycle is variable and can be set at whatever length of time required by the application. Generally for a sun tracker device a Sleep Cycle of 20 to 40 minutes is sufficient to maintain efficient orientation of the solar energy collector. If a parabolic collector is used, a shorter Sleep Cycle could be implemented. Any desired timing cycle may be set. At the end of each Sleep Cycle, the system is re-initiated.

In addition to a variety of timer configurations that may be of use to the customer, the apparatus can be placed into operation with no timers. That is to say, it can remain in "live" status and constantly sensitive to the position of the light source. An example of this application would be to have the tracker mounted on a moving vehicle. If the direction of the vehicle changes randomly the tracker is required to adjust accordingly to reacquire the target. On the other hand, if the tracker were mounted to a slow moving vehicle like a ship or barge, timers may be of use.

The duty cycle timer manages the overall time that the linear actuators are active. The time needed for this activity will depend on the size of the tracker, the customer requirement for the speed of the tracker, and the time it takes to acquire the target light source. A large tracker with significant mass will take more time to orient that a small light tracker. Additionally, each actuator has limiting devices on their respective extension or retraction. Consequently, the reorientation of the tracker will generally take only a few seconds to occur. However, if the timing is through the night from a sunset to a sunrise the tracker will need to move through an angle of approximately 170 degrees to acquire the sun. This may take 5 to 60 seconds depending on the size of the tracker. The duty cycle timer will allow for a full re-orientation of the device, possibly up to 60 seconds, then generate the all-stop signal and signal the sleep timer to reset.

A complete cycle may take place in seconds, thus significantly reducing the power usage of the device. The illustrated control circuit uses very little current during the Sleep Cycle. During the Sleep Cycle, very little energy is used to maintain the orientation of the carrier platform. Energy consumption during the duty cycle is dependent upon the forces needed to move the carrier platform and will vary. During the Sleep Cycle, the control circuit uses only enough power to maintain the sleep timer.

When the light source is not present, the default activity of the controller is to force the actuators to retract. Each actuator has a stop or limit device for its full extend and retract positions. In the case of the electric screw cylinder, limit switches may be used to cut the power to the screw motor. During a "low light" event, the actuators fully retract and stop, as though it were night. In this state, the platform faces square to the zenith. The duty cycle timer will complete its cycle and the device will immediately return to its low energy state of the global timer. With all actuators retracted, the carrier platform will align the sensor array module central axis with the axis of the support column. Thus, on a cloudy day the instant tracker will retract, thus maximizing the sky solid angle and positioning the platform such that it is ready for the sun to come out at some other position. At night, the tracker goes into the retracted actuator orientation. This also provides a reduced frontal area exposed to lateral winds in low light conditions of storms.

With the desirability of low energy consumption, memory of the last orientation is not maintained. This is acceptable because the tracker will always orient as needed when the sun comes out. The need for a differentiation between low and no ambient light is minimized and therefore ignored because of the simple relationship between sensors and actuators. In cases where ambient light detection is desired or needed, the detection of a signal of the presence of ambient light, initiates the first duty cycle. If the sun is available, the device will immediately orient itself toward the sun. If no (or insufficient) sun is available, the device actuators remain in a fully retracted state, the duty cycle timer will complete its cycle, followed by the sleep cycle timer sequence.

The ability of the instant tracking system to achieve full frontal exposure to the sun (i.e., the Sight Axis of the platform intersects the sun) throughout the day, 365 days per year. The simple mechanical components of the invention are relatively inexpensive. Assembly and maintenance are reduced due to the relatively few components and the use of standard, available components, such as actuators, sensors (which may be photo resistors) and solar cells. The electrical control system is modular and simply plugs in to the actuators and sensor array module. The simplicity enables an economical solution to the solar tracking industry that will allow consumers to set up and begin using the device almost immediately. No special skill or training is needed in the understanding of one's location on the planet.

The instant device will easily track a target light source through any spherical or celestial path. It will track the sun as easily at the Arctic Circle as it will at the Equator. With the appropriate mounting kit any solar panel can be kept facing the sun directly anytime the sun shines. During cloudy days the panel will face directly upward and will gather light from the largest part of the sky at all times. For example, this would maximize the light gathering capability for a solar panel.

With a simple setup procedure, relatively low cost purchase, the return on investment will be significantly increased beyond a lesser efficient and more expensive solar tracking device. As a solar tracking device, it will find immediate use anywhere on earth, particularly in the higher latitudes. Additionally, as a low maintenance device, it will need no seasonal alignment with the position of the sun at any given time. In regions of snow and ice, the sensor array module can be displaced to any height above the tracking platform to ensure it is always able to acquire the sun.

There is no digital clock needed to set with month, day, and time. When the sun comes up this tracker goes to work. There are no expensive parts except the linear actuators. All other components can be fabricated.

Other features and advantages of the present invention will be understood by those skilled in the art from the following detailed description of a preferred embodiment accompanied by the attached drawing in which the same parts are referred to by identical reference numerals in the various views.

BRIEF DESCRIPTION OF THE DRAWINGS

FIG. 8 is a logic chart illustrating the condition of the actuators under various operating conditions.

DETAILED DESCRIPTION OF THE ILLUSTRATED EMBODIMENT

The system shown and described is able to track the target light source within a solid angle of approximately 5.2 steradians, that is, about 10 degrees up from the horizon in a full 360 degrees. Consequently, it can be used as a solar detector at almost any latitude on earth. As a solar panel tracker, the instant system can be used from the earthly poles in their respective summers to the Equator. Once mounted, the device is oriented, only power needs to be supplied. The integrated sensor/actuator controls will power up and orient the device to the direction of the target.

Figure 1:
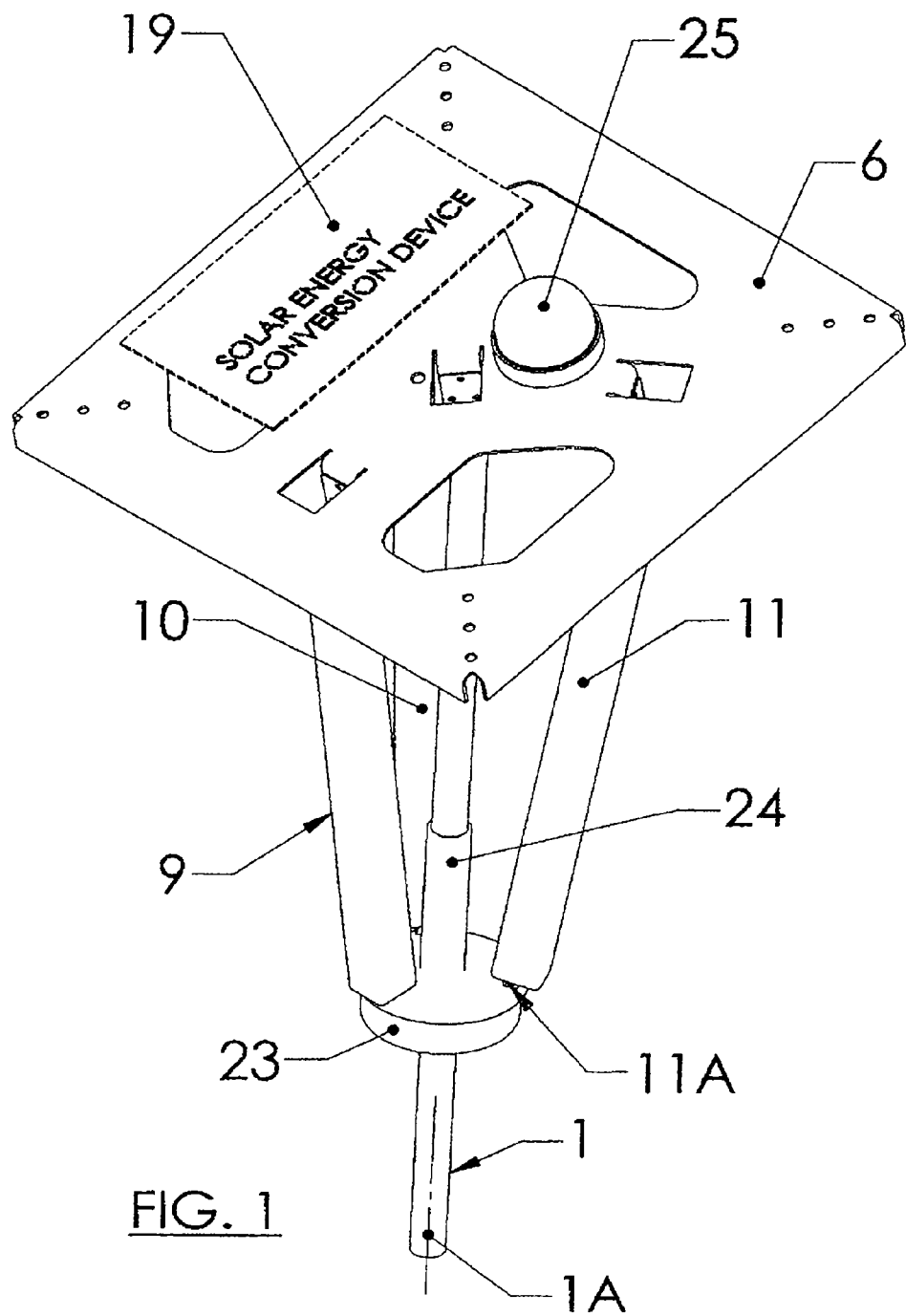
FIG. 1 is an upper perspective view of the carrier platform, linear actuators and support.
Figure 2:
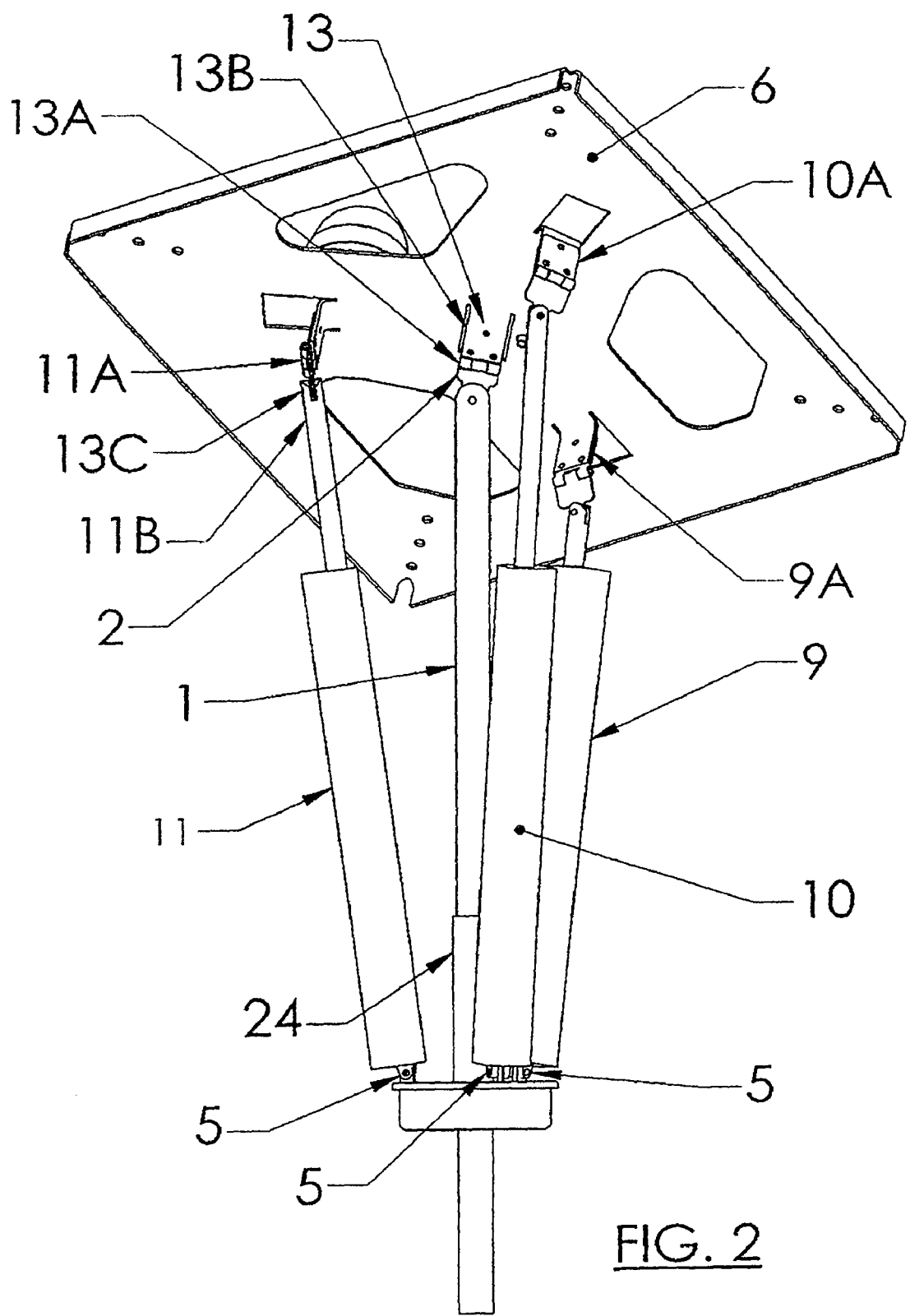
FIG. 2 is a side view of the device of FIG. 1, showing hinges and actuators in a position targeting the location of the sun near the horizon; and into the plane of the page.

Referring to FIGS. 1 and 2, the device comprises a multi-axial mechanical system including three linear actuators 9, 10, and 11. Suitable actuators may be obtained from Firgelli Automation at: firgelliauto.com/product. Each actuator extends and retracts linearly and has a base end (11A for actuator 11, FIG. 2), and a rod end 11B. A single support column 1 supports the entire device. The support column 1 may be mounted to a stand (portable) or permanently fixed, as in concrete, and it defines a support axis, represented by dashed line 1A. At the top of the support column 1 is a universal joint 2 (FIG. 2) which is connected to the central portion of a carrier platform 6 on which the payload devices, such as solar panels, one of which is shown at 19 in FIG. 1, are mounted. The universal joint 2 is connected to and supports the center of the carrier platform 6. The universal joint 2 has two independent axes of rotation but is constrained against rotation about the third axis. The carrier platform 6 is mounted such that it is capable of tilting in a solid angle, typically 5.2 Steradians, but can be designed by those skilled in the art for somewhat more or less, if desired. The universal joint 2 allows rotation of the carrier platform 6 in the two orthogonal axes normal to the longitudinal axis of the support column 1 but restrains rotary motion about axis 1A. Consequently, the payload device 8 mounted on the carrier platform 6 does not rotate about the longitudinal axis of support column 1. It can be said to "roll" about the support column 1. Universal joint 2 allows a two-axis movement, both axes are perpendicular to the axis 1A of the center column 1 (which is assumed to be vertical, but which is not necessarily the case).

Referring to FIG. 2, the universal joint 2 which connects the center of the carrier platform 6 to the support column 1, includes a hinge plate 13A connected by a pin 13C to the top of the support column 1, and including ferrules receiving a second pivot pin at 13C perpendicular to the axis of pin 12 and forming a hinge pin between hinge plate 13A and a hinge plate 13B which may be stamped out of the metal sheet from which the carrier platform is formed.

In the present embodiment the rods of actuators 9, 10 and 11 are capable of limited rotation about their axes. As a result, a universal joint is formed between the distal ends of each of the rods of the actuators 9, 10 and 11 to the carrier platform 6. These joints are designated 9A, 10A, 11A, respectively.

Referring now to FIG. 1, a floating base 23 includes a guide tube 24 that slides freely along the z-axis or support axis 1A (i.e., of the axis of support column 1) and a disc-shaped member or plate 23 (referred to as a floating base) that is slideably received on the support column 1. The floating base 23 extends generally laterally of the support axis 1A. The floating base 23 contains sockets for the pins of pin joints 5 for the lower ends (or butt ends) of the outer tubes linear actuators 9, 10, and 11. The linear actuators 9, 10, and 11 secure, control and support the floating base 23. That is, the three actuators 9, 10, and 11 have their rod ends connected to and the carrier platform 6 by universal hinges 9A, 10A and 11A as described above, and the butt ends of the actuators are pinned to the floating base 23. The actuators thus carry the floating base 23, which is free to move up and down on the support column 1, guided by tube 24. There is a constant load due to gravity at the central pinned joint 13C of the carrier platform 6. All loads that induce rotation in the rotating axes of the central universal joint 13 mounted to the central support column 1 are countered internally by the actuators 9, 10, and 11, the carrier platform 6, and the floating base are supported by the pinned joints of the carrier platform 6. The central universal joint comprised of 12, 13, and 14, and the central support column 1 support all vertical loads. All loads normal to the central support column 1 and cause bending of said column are countered structurally by the column itself. The carrier platform 6 does not rotate about central column 1.

All the actuators are attached equally around the floating base with the joints in a plane normal to the longitudinal axis of the support column. As this structure is stable and in equilibrium all the net forces balance out. That is to say, the sum of all the forces equal zero. Nominally, the vertical push/pull forces caused by rotation of the carrier platform simply balance out. The floating base remains fixed vertically along the longitudinal axis of the column. Additionally, these same push/pull forces would cause the floating base to rotate away from concentricity to the longitudinal axis. However, these vertical forces induced in the direction of the longitudinal axis of the column the floating base easily resists the moment induced by the actuators pushing downward and upward simultaneously. The floating base includes center tube 24 constrained and will remain concentric to the shape of the column. The forces induced by the actuators that are in a plane normal to the longitudinal axis of the column have the vector sum of the forces equal to zero. There is no remaining force that would cause rotation about the longitudinal axis of the column. In summary, all the forces that might cause the floating base to rotate about the longitudinal axis of the column are balanced internally. The floating base will move only slightly to balance the net triangular shapes imposed by what is ultimately a tetrahedral shape.

The linear actuators 9, 10, and 11 that are mounted to the floating base 23 have multiaxial rotations at their associated pin joints 5, but have no local displacements and are thus fixed to the floating base 23. If the floating base 23 is rotated, it translates upward. With the effects of gravity, the sliding actuator mount assembly 2 and all three actuators 9, 10, and 11 seek the lowest point at equilibrium. The purpose of this is to relieve any local translation away from the center axis of support column 1 at a universal joint 14 (which connects the top of the support column 1 to the center of the carrier platform, FIG. 2) that may be imposed by the rotation of the upper platform 6 due to the offset from the z-axis of the support column 1. The lower pinned joints 5 are spaced evenly at 120 degrees around the axis of support column 1.

Referring to FIGS. 1 and 2, a sensor array module 25 is mounted to the top of the carrier platform 6. The sensor module (and the carrier platform) are oriented by the movement of linear actuators 9, 10 and 11. The rod ends of the actuators are mounted on the bottom side of the carrier platform 6 by means of the three hinges 9A, 10A and 11A as seen in FIG. 2. The upper member or plate of each of the hinges is rigidly fixed to (and may be stamped from) the carrier platform 6. Each of the linear actuators 9, 10, and 11 is spaced equally at 120 degrees on both the carrier platform 6 and the floating base 23. The lower half 13A of each universal joint 9A, 10A and 11A is pinned (at 13D) to the rod of an associated actuator 11, 12, 13 to provide a local (horizontal) axis of rotation about the actuator rod of the associated linear actuator 9, 10, and 11. In the illustrated embodiment, the actuator rod is mounted to a screw and may rotate freely but within a limited range within the actuator 9, 10, or 11 barrel or housing. Thus, there are three orthogonal axes of rotation at each upper hinge 13A, 13B and 13C. Given the screw action of the actuator rod, a simple universal joint can be used to provide the two axes of rotation normal to the local z-axis of actuator 9, 10, and 11. Other multiaxial rotational joints may be employed so long as it restricts lateral displacement.

Referring back to FIG. 1, in addition to the sensor array module 25 mounted to the top of the carrier platform 6, solar panels (one of which is schematically illustrated at 19) may be mounted to the upper surface of the carrier platforms 6. Alternatively, the carrier platform 6 can support flat solar panels, parabolic reflective surfaces, arrays of lenses or any other type of surface requiring tracking capability and are referred to as the payload device 8. The carrier platform 6 provides the mounting configurations needed and functions in a dual purpose as the mount for the actuators and the mounts for the desired payload device (e.g. solar panel).

Still referring to FIG. 1, the linear actuators 9, 10, and 11 can be of any number of designs. They are required to retract or extend under a variety of loads. For larger systems carrying substantial weight (or as desired), hydraulic systems can be used. Hydraulic cylinders are linear actuators.

The Sensor Array Module

The sensor array modules 25 (FIG. 1) is described with reference to the FIGS. 3A-3E. The module 25 includes a base 27 on which there is mounted a blinder 31 formed of three intersecting walls made of opaque material 32, 33, 34 and angled 120 degrees apart so that each pair of adjacent walls forms a sector of approximately 120 degrees. At the base of each sector and at the intersection of the walls in a light sensor which may be a photoresistor (that is, the electrical resistance varies with the intensity of light incident on the active element of the photo-resistor). Thus, a sector 45A is associated with the primary sensor 36 and is defined by walls 34 and 35 of the blinder 35. Similarly sector 45B is associated with primary sensor 35 located within walls 32 and 33 and primary sensor 38 is located in sector 45C which is defined by walls 33 and 34.

Figure 3A:
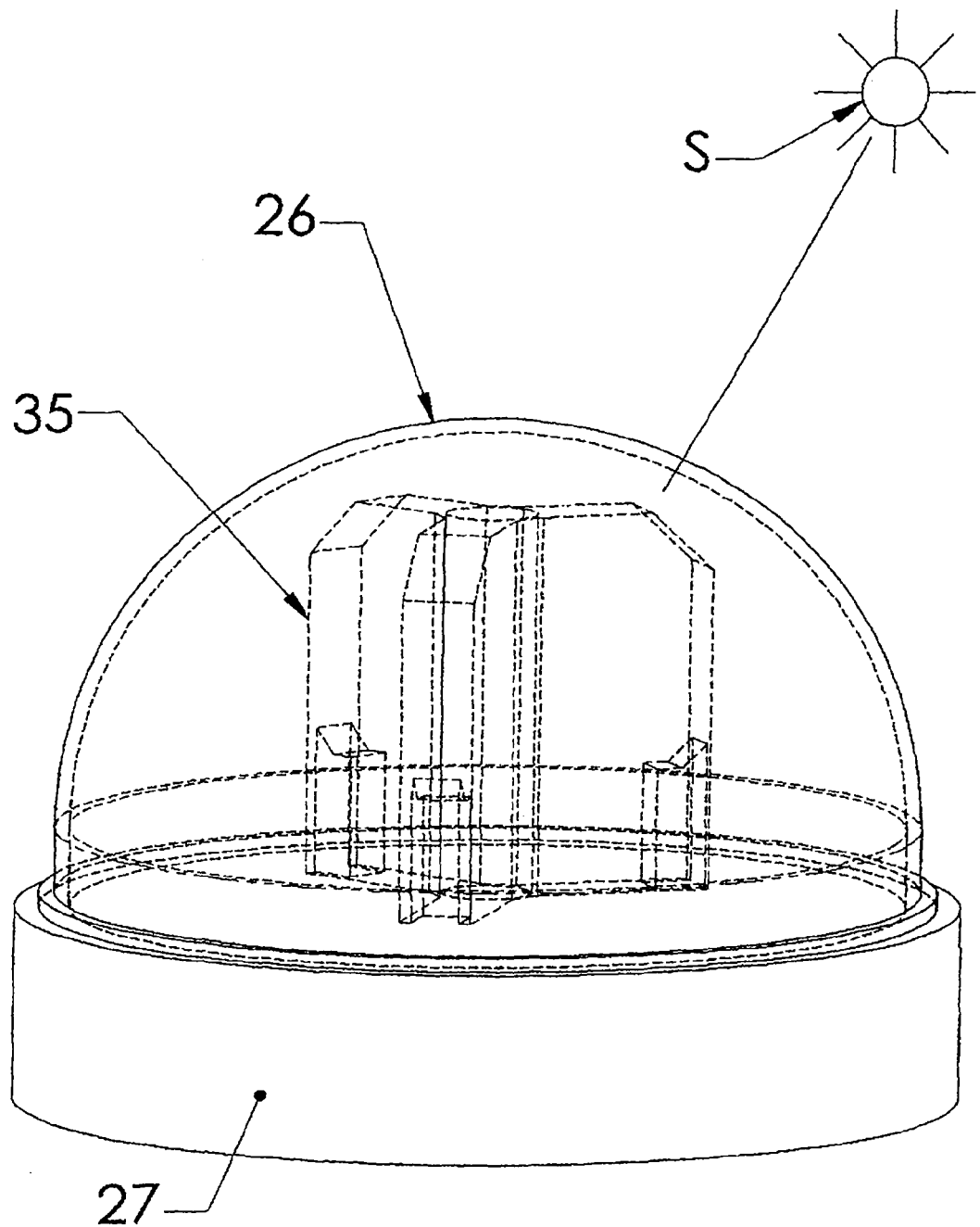
FIG. 3A is a side view of a sensor array module.
Figure 3B:
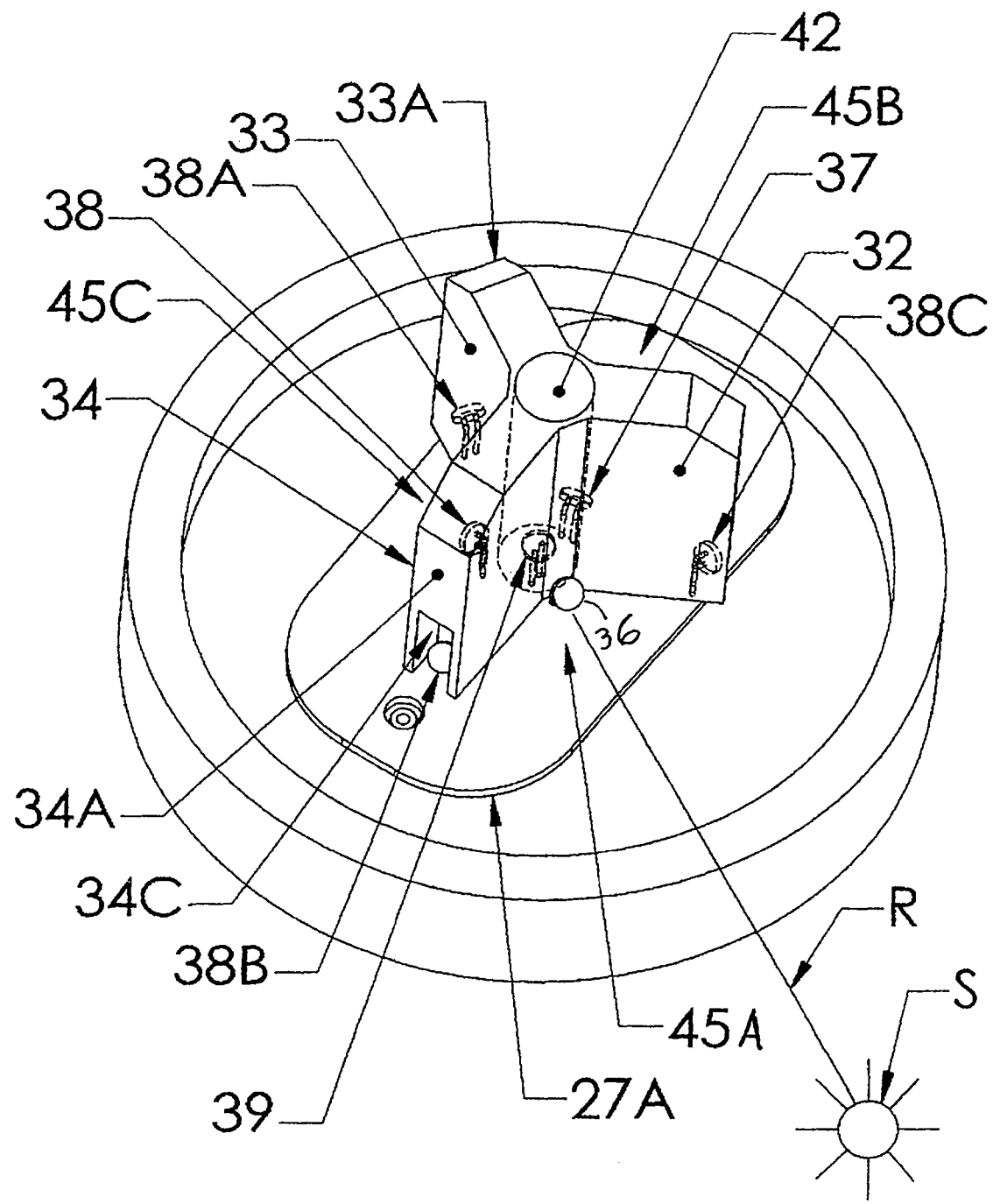
FIG. 3B is an upper perspective view of the sensor array module of FIG. 3A, with its protective cover removed.

In FIG. 3B, at the base of the sector formed by intersecting walls 32, 34, a primary sensor 36 is located to detect light when the sun (show diagrammatically at 5) is in a range of positions. The other two primary sensors are designated 37, 38; and it can be seen that the opaque blinder 31 precludes direct incidence of light when the sun is in the sector shown in FIG. 3B and low relative to the horizontal surface 29 of the base 27.

As will be described in more detail, when a particular primary sensor (which is placed at the innermost and lowest position of a sector to receive direct light from the source and is to be distinguished from ambient sensors, to be described below) such as 36 detects the light source, its associated actuator is turned off. When a primary sensor does not detect the source during normal operation, its associated actuator extends to rotate the platform (and thus the sensor base 27) about an axis perpendicular to the non-adjacent wall of the blinder 35 (in this case, wall 32), thus causing the adjacent walls 33, 34 to "flatten" or become more horizontal, thereby positioning the sector defined by walls 33, 34 which contains the primary sensor 38 until it directly views the sun. At that time the controller stops. This searching for the sun continues until all three primary sensors detect the sun directly.

At the center of the tri-part blinder 35 is an elongated opening 50 which is cylindrical as seen in FIG. 3B and may have a central axis extending parallel to the sight axis of the unit. Thus, when the sensor 39 detects direct sunlight, it actuates an "All Stop" circuit (to be described) which de-energizes all three linear actuators because the slight axis of the carrier platform intersects the sun.

The primary sensors and the associated sectors are equally placed around a horizontal plane spaced apart 120 degrees and equidistant from the center of the blinder where the "target aligned" sensor 40 is located. Each actuator is associated with a sensor pair comprising a plurality of sensors that signal the presence or absence of the light source. In the illustrated embodiment each sensor pair has a primary sensor and an ambient sensor. Each sensor pair is mounted at an angle relative to a horizontal plane of the carrier platform 6 such that when the sight axis of the array is aligned with the zenith, the horizon will also be visible to the array containing pairs sensor pairs. In this orientation the horizon is not visible to the targeting sensor. Additional sensors can be added at various angles to the array to increase angular sensitivity. Base 29 provides a housing for the sensors. The ambient sensors 38A, 38B and 38C are housed within recesses formed in the base of the outer peripheral walls 38D, 38E and 38F respectively. Thus, ambient sensor 38A is mounted in recess 38D located at the base of peripheral wall 34A of sector wall 34. The base mount 23 (FIG. 3B) for the sensors rises toward the center to enable the sensors to "view" the horizon.

Support columns may be tubular to allow for wiring of the sensors and it includes a mount for the sensor array module 7. The opaque walls or separators 32-34 limit the lateral field of view for each sensor 36, 37, and 38 to approximately 120 degrees. The ambient sensors 38A, 38B and 38C monitor the reflected light produced by the light source and reflect back to the sensor module. The ambient sensors 38A, 38B and 38C are each located in the opaque wall opposite their respective primary sensor 36, 37, and 38 respectively. The cover 28 (if used) is transparent and is rigidly mounted.

Figure 3C:
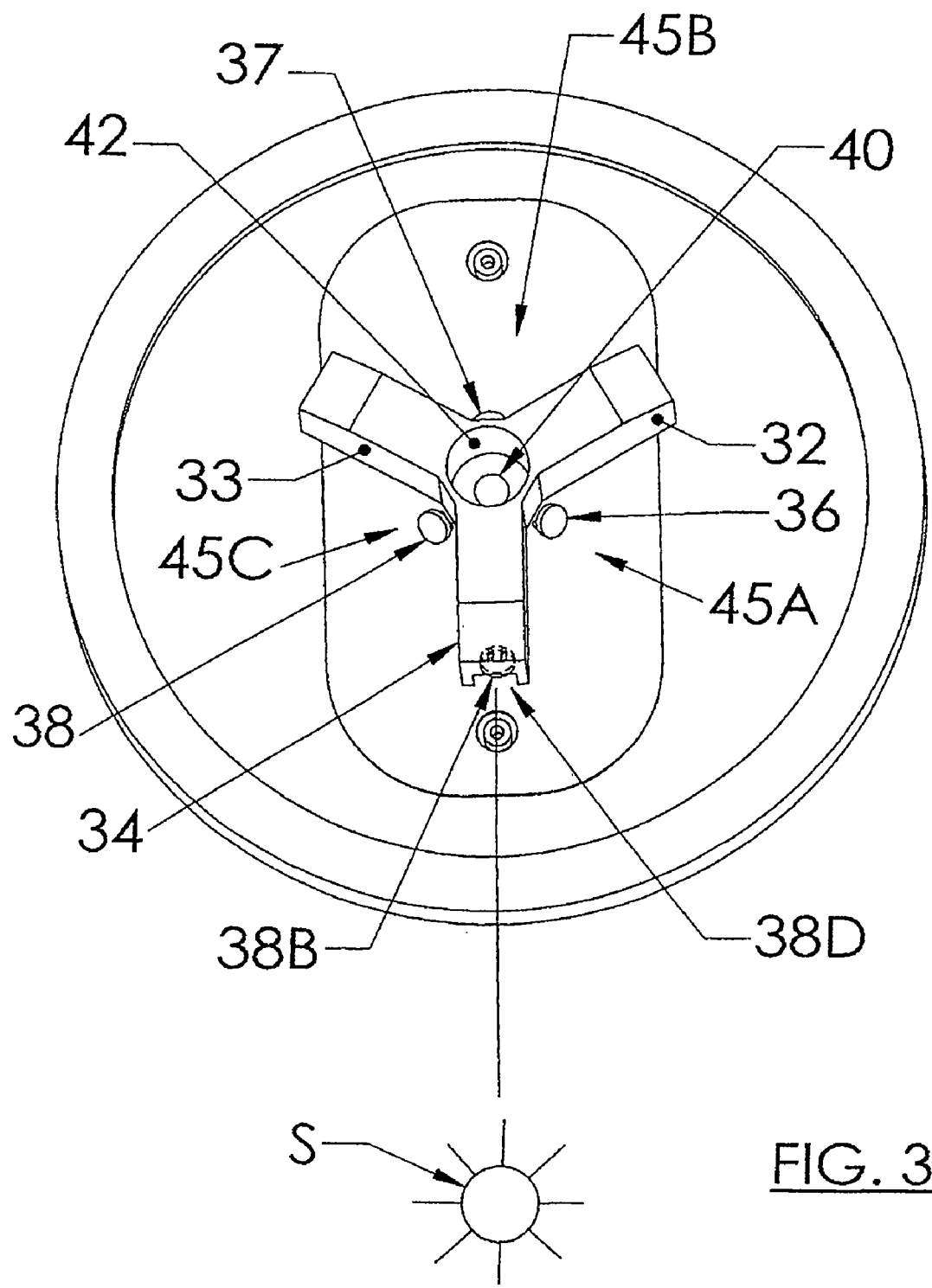
FIG. 3C is an upper side perspective view similar to FIG. 3B illustrating various angles at which the sun's rays may impinge, depending on the position of the sun.
Figure 3D:
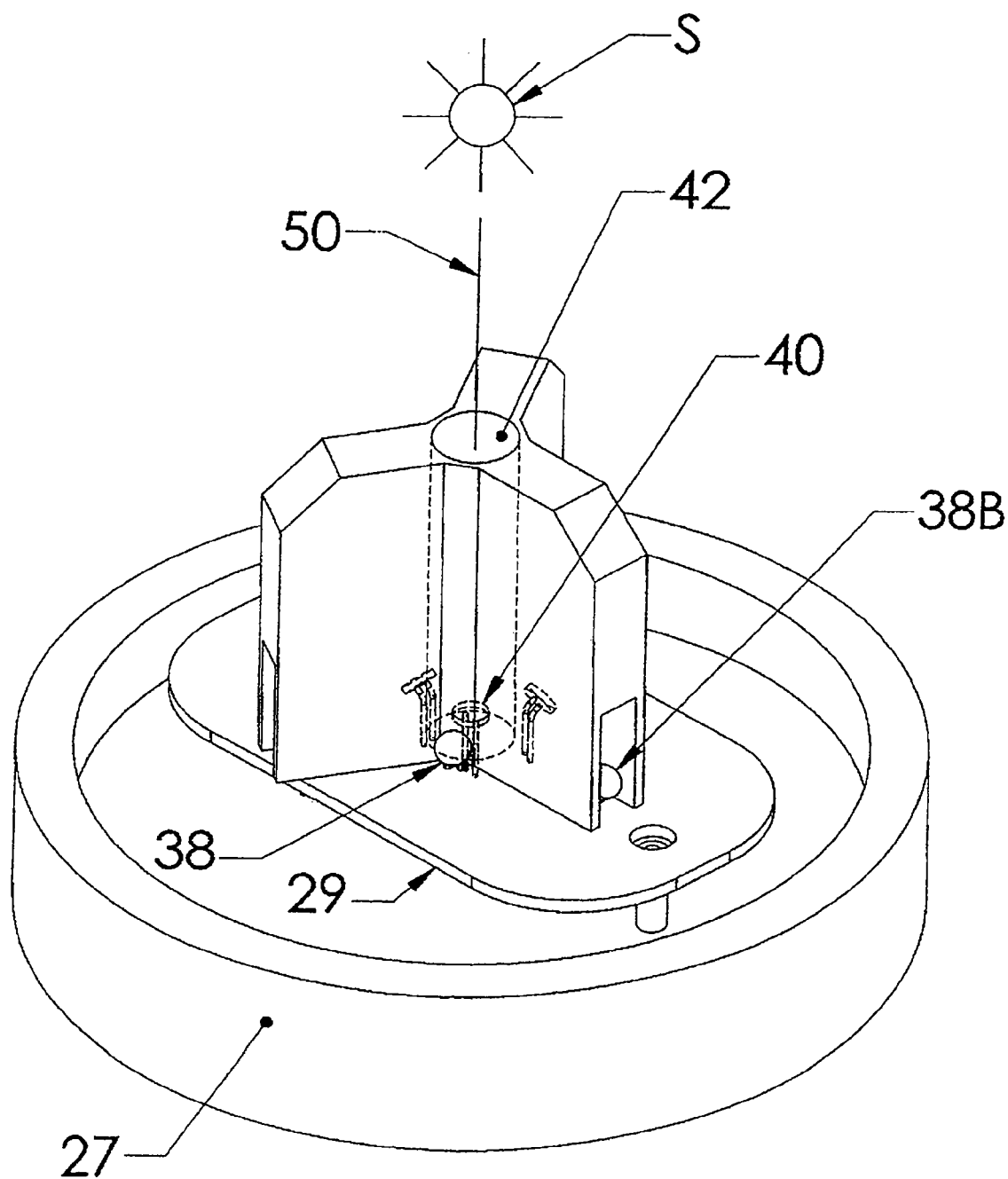
FIG. 3D is a perspective view of a sensor array with the sun directly above the array.
Figure 3E:
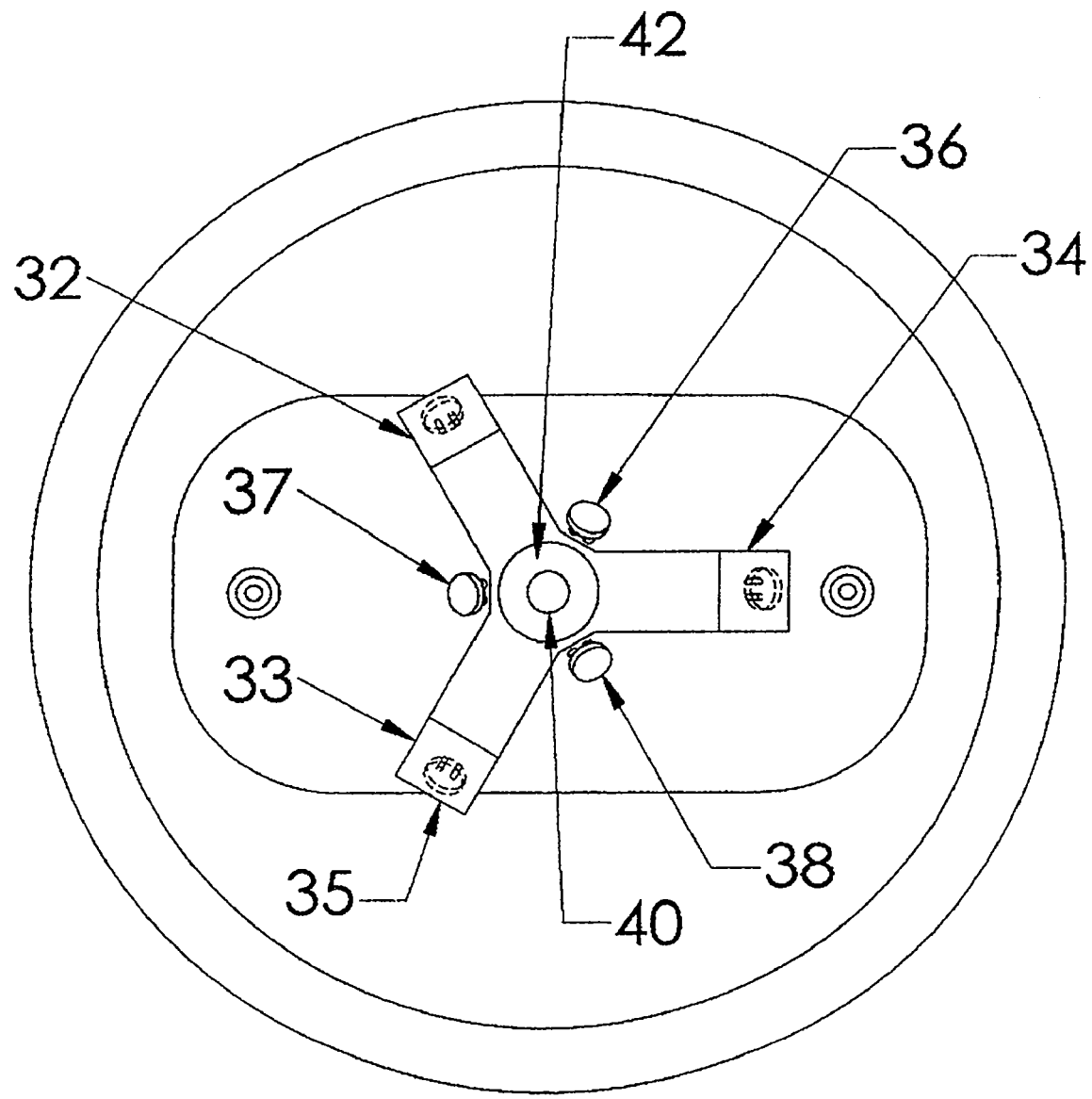
FIG. 3E is a top view of a sensor array.

The separator walls or panels 33, 34, 35, as seen from FIG. 3E, are equally spaced at 120 degrees. The three walls 33, 34, 35 limit the field of view of each sensor to approximately a third of the $2\pi$ Steradian solid angle of view. The height of the three panels 19 may affect the targeting accuracy of the device. Effectively, the accuracy of the tracking device can be enhanced by the geometric placement of the sensors, the height of the three separator walls, and, the height and diameter of the targeting sighting recess 42. The cover 28 may be made of a translucent material that transmits a desired intensity and/or wavelength(s) of light. Thus, in addition to the electronic controls, the cover 28 effects sensitivity. It may also act as a cover to protect the sensors 36, 37, and 39, 150, 151, 152, and separator walls from the environmental elements.

All three sensors 36, 37, and 38 will acquire the target light source when the module's vertical sight axis sensor 40 is pointed at the target light sources. The z-axis 50 of the sensor array is normal to the plane of the carrier platform 6. As the linear actuators 9, 10, and 11 variously extend or retract, the array 7 will eventually come into a position in which all three primary sensors 36, 37, and 38 and the recessed sensor 40 also have line-of-sight view to the target source. When all four sensors acquire the target light source an "All Stop" circuit (to be described) is enabled, and it locks the tracking panel into position at an angle directly facing the target light source (at the time of acquisition).

Referring now to FIGS. 3A-3E, various orientations of the target light source illustrate the operation of the system. FIG. 3A shows the Sensor Array 7 of FIG. 1 with the shading panels generally located within the structure of the Cover with the incident light source illuminating various sensors.

FIG. 3B shows the illumination of the primary sensors for one disposition of the sensor relative to the target sources. Primary sensor 36 is illuminated and its associated ambient sensor 38A is shaded. A significant difference in brightness is registered and the controller generates a signal to extend actuator 10, coupled to a location diagonally opposite primary sensor 36. This raises the wall 33 of the blinder 35 and tilts the sensor array such that the axis of the sighting recess 42 becomes more in alignment with the diagrammatic light ray of the source and elevating the associated ambient sensor 38A upwardly relative to the associated primary sensor 36, thus increasing the amount of light sensed by the ambient sensor. The other two primary sensors 37, 38 are not directly illuminated; and the controllers generates a signal to retract their associated actuators 9, 11. Illumination of the ambient sensors simply strengthens the retract signal. The "target acquired" sensor 40 is not yet illuminated.

FIG. 3C shows an orientation of the array wherein two primary sensors 36, 38 are illuminated by the sources located toward the bottom of the page, and their respective ambient sensors are shaded causing the signal to extend for the two associated actuators. The third primary sensor 37 is shaded while its ambient sensor 38B is directly illuminated. In this case, the controller generates a signal to retract the actuator associated with sensor 37. The target sensor is not yet illuminated due to the lower position of the target.

FIG. 3D shows the light source generally overhead and aligned with the local Z-axis or sight axis 50 of the Sensor Array 7. In this event the target sensor 40 is illuminated. The controller signals an "all stop" circuit to cease all signals to the actuators. Coincidentally, all the primary sensors will be illuminated while the associated ambient sensors are shaded.

As the actuators independently extend and retract eventually a second and then the third sensor 36, 37, and 38 will become directly illuminated. When the target sensor 40 becomes illuminated (FIG. 3E), the "all-stop" signal is given. The orientation of FIG. 3C, however, shows sensors 36 and 38 as illuminated and sensors 37 and 40 as shaded. In FIG. 3E, the tracker has moved such that the recessed sensor 40 is also illuminated and the ambient sensors are not directly illuminated. At this slight angle from zenith, sensor 40 signals the all-stop. Sensor 40 is illuminated at a small solid angle defined by the diameter and length of the tubular recess in which it is mounted, and the physical size of the sensor.

The Electronic Controller

Figure 4:
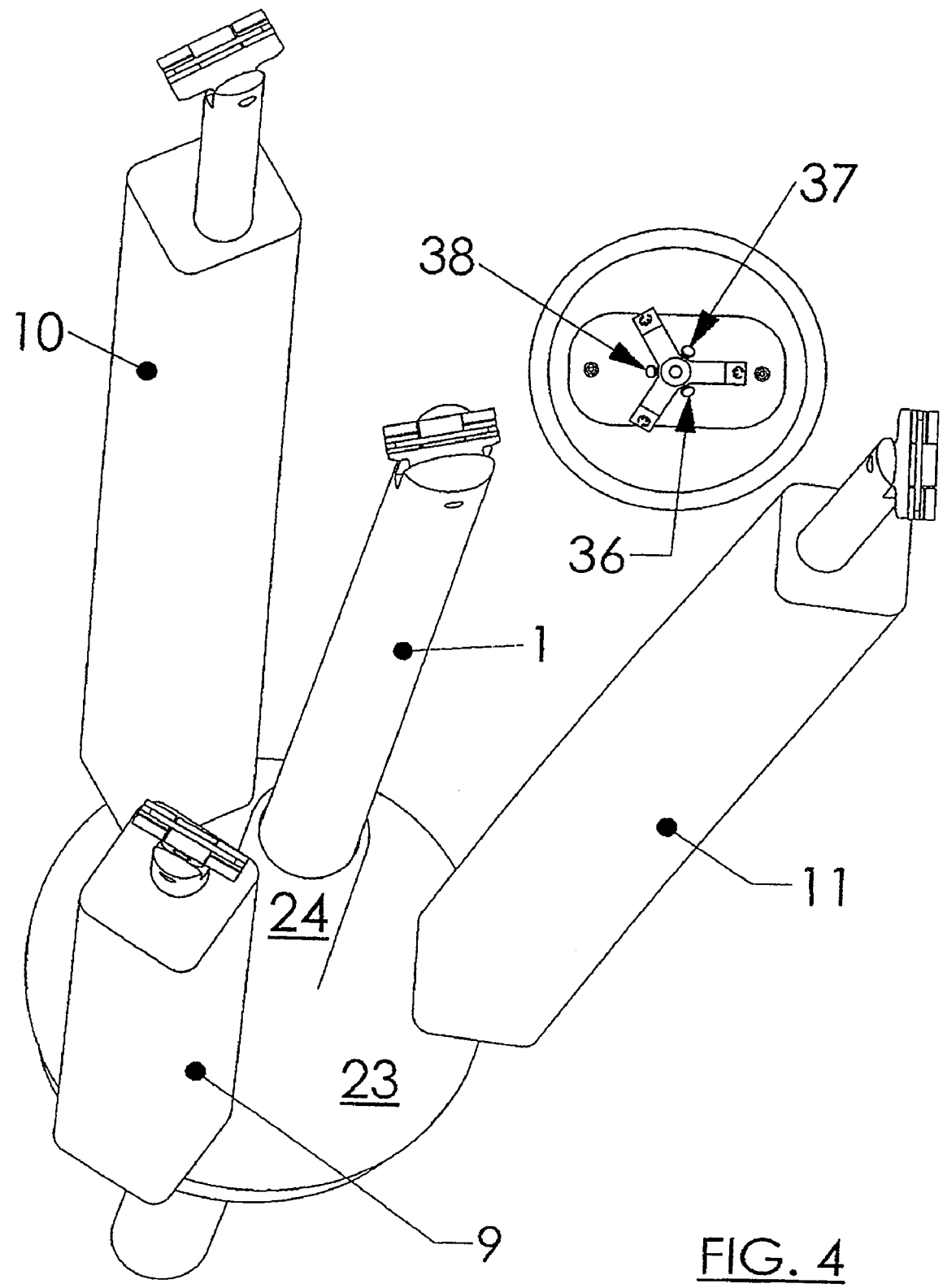
FIG. 4 is an upper perspective view of the device of FIG. 1 without the carrier platform showing the Linear Actuators, floating base and a sensor array module in an adjusted position directly viewing the sun in the position of an observer.
Figure 5:
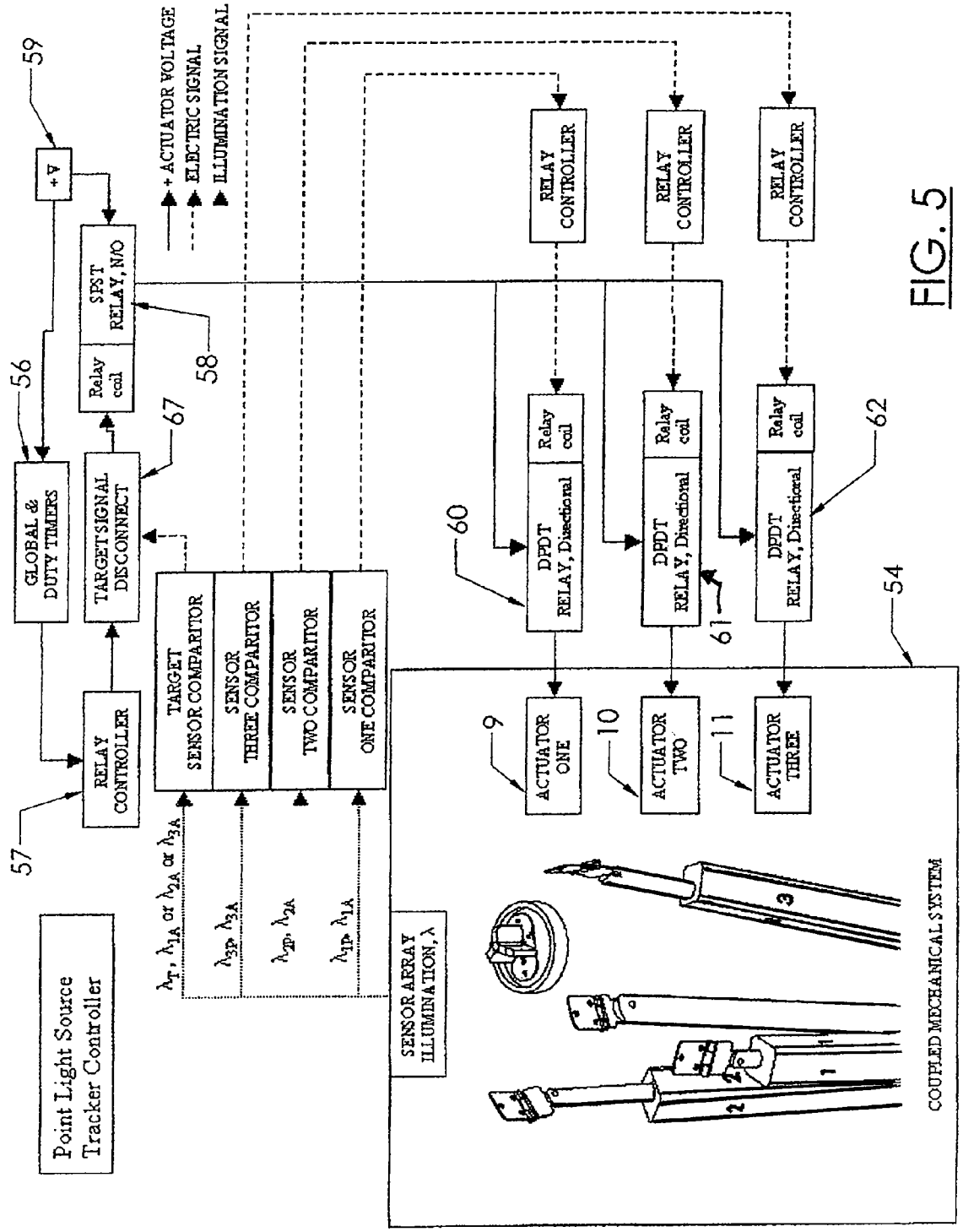
FIG. 5 is the block diagram of a control system (controller) for the tracker.

FIG. 5 is a block diagram of the electronic controller for the actuators. The coupled mechanical system image of the apparatus shown is similar to that of FIGS. 1 and 4, which can be used for visual reference. The geometry in the coupled mechanical system image within block 54 represents the carrier platform 6 of FIG. 1. The upper part of the diagram of FIG. 5 shows the integration of the system sensors with the actuator enable and drive components. When voltage is applied to the system, a Global Timer 56 generates the Sleep and Duty cycles for the apparatus. After a specified time, the timer 56 signals a single pole single throw (SPST) relay controller 57 which, in turn, energizes a normally open relay circuit 57 of a single pole relay 58. Electrical current is then sent to three set of double pole-double throw (DPDT) relays 60, 61, 62 for driving the linear actuators 9, 10 and 11 of FIG. 1. Each relay 60, 61, 62 is cross-wired such that if there is no signal from the associated actuator relay controllers 63, 64, 65, activation of relays 46-47 will cause all the associated actuators to retract. This, in turn, causes the coupled mechanical system of FIG. 1 to reorient the Sensor Array toward a horizontal position. This activity may or may not change the incident illumination of the associated sensors. However, in the presence of the point light source, the states of all sensor array sensors may change to that of illuminated in any combination and is represented by a general sensor array input, $\lambda$.

Lambda inputs are defined as follows for use in FIG. 9 Block diagram $\lambda\tau$ is the source light input to the Target Sensor, $\lambda_{1P}$ is the input to the primary sensor of Actuator Primary, $\lambda_{2P}$ is the light input of the Primary sensor of Actuator 10, $\lambda_{3P}$ is the input to the Primary sensor of actuator 11, $\lambda_{3A}$ is the input to the Ambient Sensor of Actuator 1, $\lambda_{2A}$ is the input to the Ambient Sensor Actuator 2, $\lambda_{3A}$ is the input to the Ambient Sensor of Actuator 12. These primary/ambient inputs are compared for relative brightness and the appropriate signal is sent. The Target sensor output cuts the Timer enable. The actuators are controlled by the outputs of the primary sensors. A high signal causes the actuator to extend, a low signal causes it to retract.

Referring to FIG. 10, all combinations of the states of $\lambda$ are described. If sensors are illuminated such that there is any combination of, $\lambda_1$, $\lambda_2$, or $\lambda_3$, it provides a signal to the associated Relay Controller, which in turn activates the associated Double Pole Double Throw relay, thus reversing the current flow to the associated actuator. Since illumination of a sensor causes the coupled mechanical system to seek a position normal to the point light source and since all three sensors are seeking the point simultaneously, the plane of the carrier platform 6 moves inevitably toward an orientation normal to the position of the point light source.

When the carrier platform 6 approaches the position normal to the Point Light source, the Target Sensor 40 will become illuminated, $\lambda_T$. In that event, a signal is sent to the normally-closed Target Signal Disconnect Circuit 67 controlling the Single Pole (SPST) Relay 58. The Single Pole Single Throw relay is de-energized and current is cut off to all actuators. This set of circumstances is represented by the Orientation number eight of the logic diagram of FIG. 10 and is called the "All Stop" state. As long as the Global timer signals the Duty cycle and the Target Sensor remains illuminated, the apparatus will remain motionless. The targeted point light source has been acquired. As long as the Global timer signals the sleep cycle, the Single Pole Single Throw relay remains in its normally open circuit state and no current flows to the linear actuators 9-11 of FIG. 1.

The double pole double throw relays 60-62 are cross-wired and are referred to as a directional controller for the associated linear actuator. These circuits control the extension or retraction of the associated linear actuator. If a voltage is applied, current is always supplied to the actuator.

In summary, the Sensor Array of the coupled mechanical apparatus is dynamically controlled by the illumination, $\lambda$, of the coupled sensors. This activity is stopped by the illumination of the Target Sensor. The Global Timer provides the overriding system control timing.

The hinges 13, when mounted to the bottom of the carrier platform 6 form an equilateral triangle in the present embodiment. Other applications may require other dimensional triangular arrangements. For example, location of the hinge to the center of the column 1 affects the speed with which the carrier platform rotates. The sensor array module 7 of FIG. 1 mounted on top of the payload device 8 is associated with the three linear actuators 9, 10, and 11 with similar triangular geometry.

Primary sensors 36, 37, 38 are placed circumferentially and spaced at 120 degrees around a horizontal circle. The sensor array module 7 is preferably located on a plane parallel to the carrier platform 6. The sensor array 7 of FIG. 1 can be placed anywhere on the payload device 8.

Referring now to FIG. 4, generally, when the target light source illuminates a photoresistor its resistance changes, which generates a signal to force the associated linear actuator to extend. Referencing FIG. 4, primary sensor 36 is therefore exposed to the part of the sky opposite the associated linear actuator 10. Primary sensor 7 is exposed to the part of the sky opposite the associated linear actuator 9. Primary sensor 38 is exposed to the part of the sky opposite the associated linear actuator 11. With this arrangement, when any one of the linear actuators 9, 10, or 11 extends, the carrier platform 6 is rotated toward the area of the sky that is incident upon, and thus actuating, the associated photoresistor. Each of the other two linear actuators 9, 10 of FIG. 1 will operate in a similar manner but independently of any of the other actuators. The net behavior of all linear actuators combined defines the plane of inclination to which the sensor array module is forced. With the movement of the carrier platform 6 eventually illuminating the collimating sighting recess 42 which houses the central "All Stop" sensor 40 of FIGS. 3C-3E, all movement of the actuators is stopped.

Operation

The system described is fully automatic and will dynamically track an intended light source regardless of the initial position and trajectory of that light source. It can be electronically configured to be self-actuating enabling the use of the device in remote areas. Power loss will not affect the operation once power has been regained. There is no electronic memory to maintain and no initial orientation is required.

The operation of the device is simple. The control system is completely integrated into the tracker mechanism. It functions automatically, to track a light source in a hemispherical trajectory. As a solar panel tracking device it preferably is placed on a vertical support, such as column 1 of FIG. 1, so that the hemispherical tracking capability described above aligns with the sky.

Other applications for the device may have other targeting needs that require a central column that is not vertical and cannot be gravity enabled. Referencing FIG. 1, a simple tension spring could be used to pull the sliding actuator mount 1 away from the carrier platform 6.

The basic geometry of the device is that of a set of four triangles (three formed by extending the axes of the linear actuators until they meet on the axis 1A of the support 1, and the fourth by the mounting of the rod ends of the actuators to the carrier platform 6) attached at common points and sharing common edges, thus forming a tetrahedron. What might be typically called the base (or bottom surface) of the tetrahedron has been inverted, and is supported by a column at the center of one of the triangles designated to be the inverted base.

Figure 6:
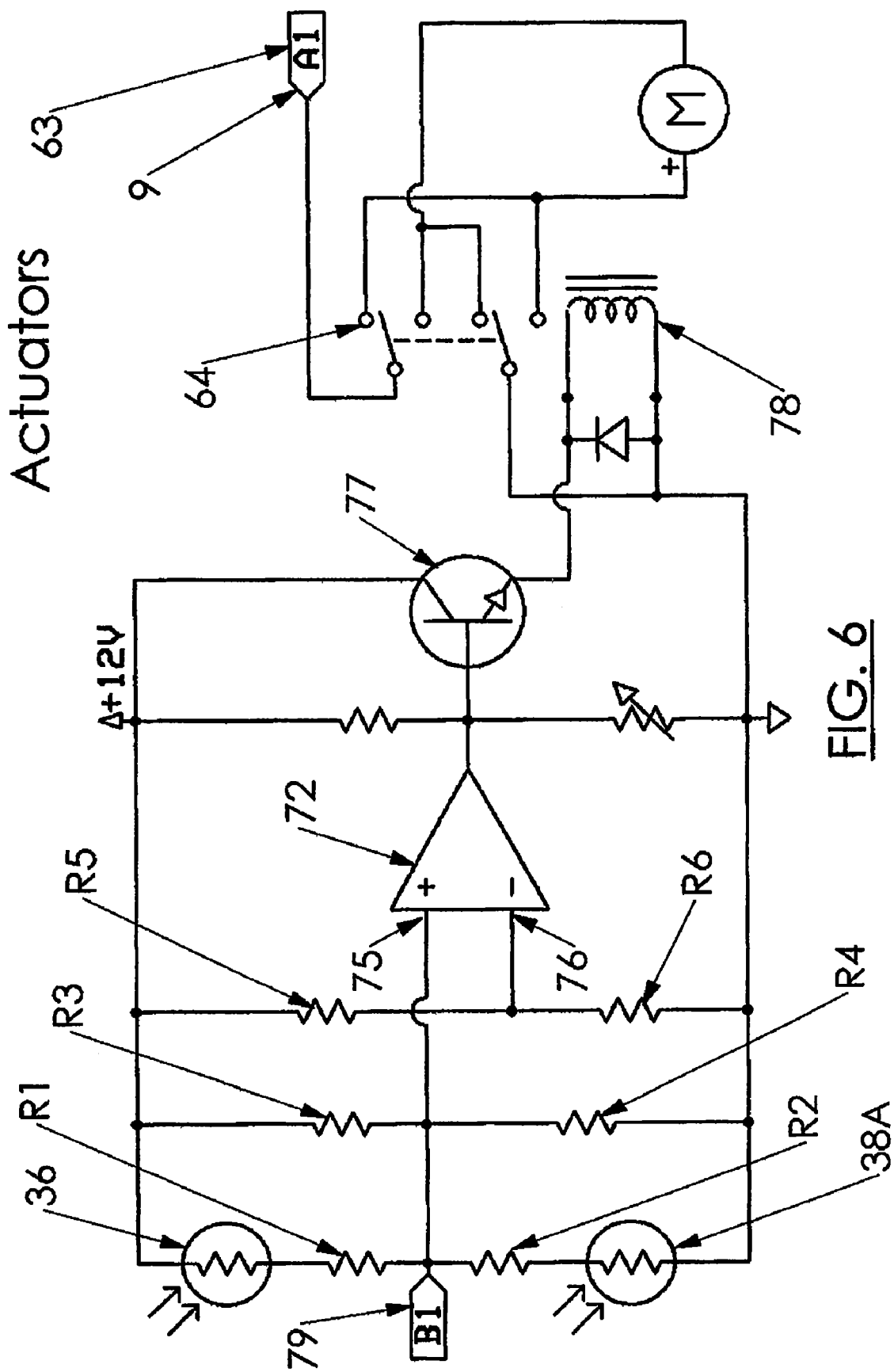
FIG. 6 is a circuit schematic of a control circuit for each actuator.

Turning now to FIG. 6, there is shown a circuit schematic diagram for the drive circuit for each of the actuators 9, 10, and 11. All three drive circuits may be the same, so only one need to be described for an understanding of the invention by those skilled in the art. The actuator may be the one designated 63. Actuator 63 is connected in series with the contacts of a double-pole, double-throw relay 64 and a source of electrical energy M, which may be a battery associated with actuator 63.

The primary sensor 36 and connected in series with its associated ambient sensor 38A and a resistor R2 which has a value greater than R1. The junction between R1 and R2 forms a junction or node 71 which is also connected to a junction between resistors R3 and R4, and to an input 75 of a comparator circuit 72. R3 is greater than that of R4, and the resistance of R3 and R4 are very much greater than R1 and R2. A second input 76 of the comparator 72 is connected to a junction 63 between fixed resistors R5 and R6 (which may be equal in resistance).

It may be assumed that the response characteristics (i.e. incident light versus resistance) of the photoresistors 36, 38A are equal. In operation, when primary sensor 36 is not receiving directly incident light, the values of the respective sensors 36, 38A are great in comparison to R1 and R2 and substantially equal. Thus, the voltage at node 71 is greater than at node 73 (because R2 is greater than R1 and R5 and R6 are equal). Thus, the voltage at comparator input 75 is greater than that at node 73 (the input 76) and the comparator 72 does not generate a positive signal to cause transistor 77 to conduct.

When the light source on the primary sensor 36 is direct, its resistance decreases substantially, while the resistance of the associated ambient sensor 38A remains generally constant, so that the voltage at node 71 increases substantially relative to the constant voltage at node 73, causing the comparator 72 to generate an output signal which causes transistor 77 to conduct, energizing the coil of relay 78, which causes the contacts 64 to switch from the position shown in FIG. 6 and reverse the current in actuator Al, designated 63. This reverses the direction of the actuator.

Thus, when the target light source is directly incident on a primary sensor, the associated actuator extends, and when the light source does not illuminate a sensor, the associated actuator retracts.

Figure 7:
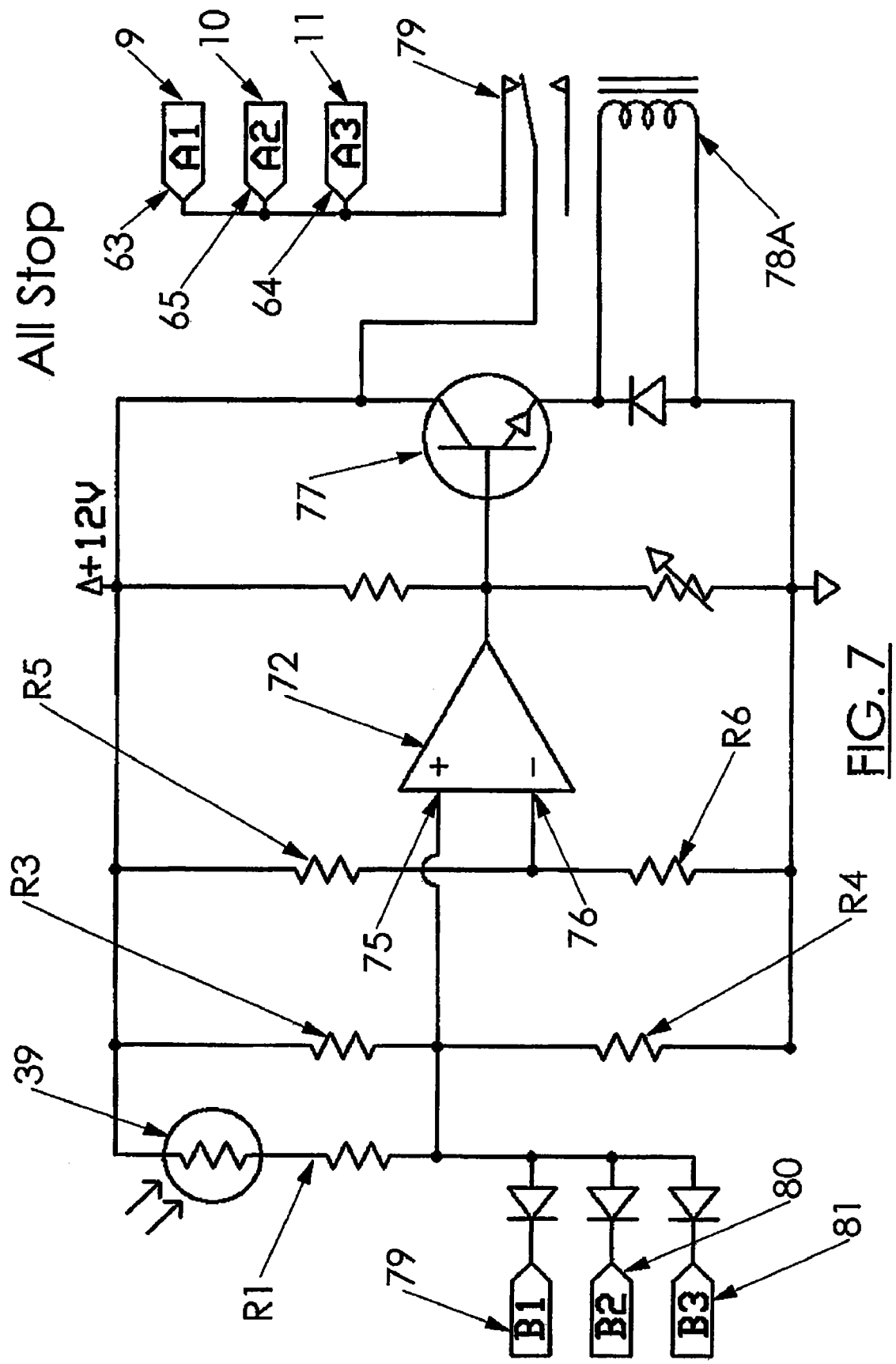
FIG. 7 is a circuit schematic for the All Stop Circuit.

The All-Stop Circuit shown in FIG. 7 is similar to the driver circuits for the actuators in configuration, components and operation. However, the primary sensor 36A is the All-Stop (or "target acquired") sensor discussed above. Hence, similar reference numerals are used for the same components. However, the output relay is designated 78A and it actuates a simple contact 64A when in the position shown in FIG. 7.

When that sensor is illuminated directly (i.e. the source is directly overhead of the sighting recess 42 and along the sight axis, the comparator 77 is caused to conduct and all three actuators 63, 64, 65 are disconnected from their associated power source. When the light source is not aligned with the sight axis, the "All Stop" circuit is not enabled, and all thee actuators are supplied with power and ready to act.

It may be observed that the spherical joints mounting the rods of the linear actuators to the bottom of the carrier platform form a triangle, and the axes of the linear actuators intersect at a point below on the axis of the support column 1. The four imaginary surfaces formed is a tetrahedron with three triangular surfaces formed by three adjacent actuator axes, and the fourth triangle by the three spherical joints attached to the carrier platform.

Figure 9:
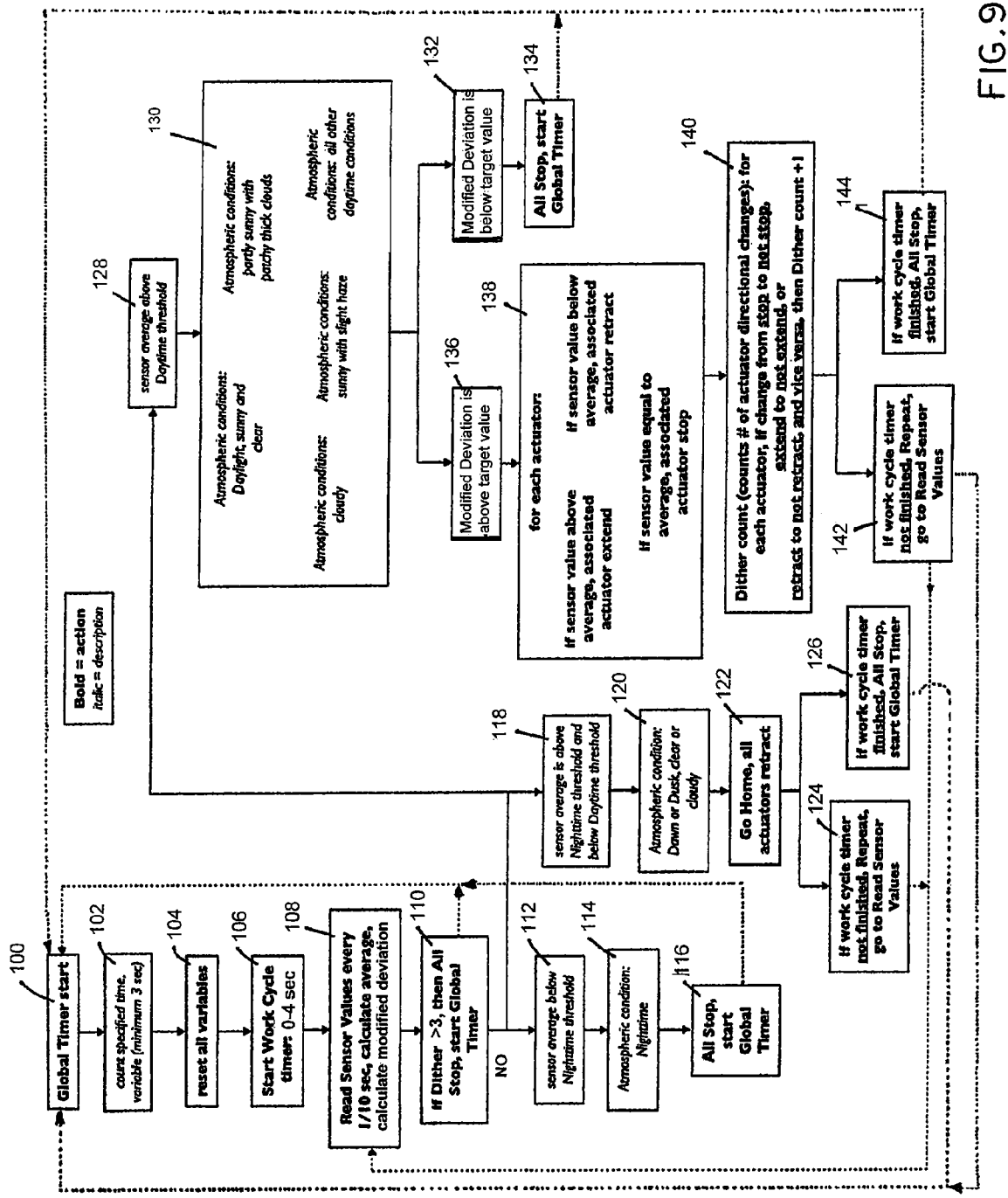
FIG. 9 is a flow chart illustrating the sequence of steps carried out in the operation of the present invention.

Referring to FIG. 9, there is shown a flow chart illustrating the sequence of steps carried out in the operation of the present invention. Each box in the flow of chart of FIG. 9 represents an action carried out during the operation of the present invention, or a decision point made by the system under the control of a micro-controller processor.

The process starts at step 100, wherein the program stored in the micro-controller processor starts a system global timer which immediately begins counting a nominal time period at step 102, which in the present invention is set at 1 minute. The system then resets all operating variables at step 104 in initializing operation of the light source tracker system. At step 106, the system initiates the start work cycle timer which is selectable and covers from 0 to 4 seconds for each operating cycle of the system. The duration of the work cycle time period can be changed in value depending upon the specific application in which the inventive light source tracker system is being used. For example, the light source tracker can be used to track the sun from a pole mounted fixedly in the ground and bearing a working payload of solar panels. In this application, the system only needs to align itself with the sun every 20 to 30 minutes in minimizing the energy required to operate the above described tracking actuators. However, the global timer cycle period can be significantly reduced to provide much more accurate alignment of the light source tracker at the expense of requiring additional energy. For various mobile applications, this higher accuracy alignment involving shorter timer cycles in detecting and tracking the sun may be required.

Following expiration of the global timer cycle, the start work cycle timer is initiated for a period of 4 seconds, whereupon the program proceeds to step 108 for reading the values of the light sensors representing the solar radiation currently received by each of the light sensors. These sensor value readings x are repeated every 1/10 second. Each time the sensor values are read, the recorded values are averaged ($\bar{x}$) to provide the mean value $\bar{x}$ as follows:

$$\bar{x} = \frac{x_1 + x_2 + x_3}{3} \qquad \text{Equation 1}$$

The variance $s^2$ is then calculated. A modified deviation $s_{modified}$ based on the variance $s^2$ of the standard deviation s of the three data points provided by the three light sensors is then calculated. The variance $s^2$ as used in the present invention is defined as $$s^2 = ((x_1 - \bar{x})^2 + (x_2 - \bar{x})^2 + (x_3 - \bar{x})^2)/2 \qquad \text{Equation 2}$$

The modified deviation $s_{modified}$ is defined as:

$$s_{modified} = s^2/\bar{x} \qquad \text{Equation 3}$$

It should be noted here that while the standard deviation s could be used in these calculations the modified deviation $s_{modified}$ is used to simplify these calculations without sacrificing sensor light detection and tracking capability and accuracy. Dividing the variance $s^2$ by the average light sensor value, or reading, maintains the targeted value manageably small to simplify programming and the hardware required for these calculations. The targeted value is the threshold light level value above which defines daylight.

Similar to calculations using standard deviation s, calculations using modified deviation $s_{modified}$ go to 0 as the individual sensor values approach the average sensor value. Given the 10-bit capability of the chosen analog-to-digital operation in a standard micro-controller, large numbers greater than $2^{10}$ are lost. Consequently, the division of variance $s^2$ by the average value of the individual sensors keeps the modified deviation manageably small. In addition, with the average increases and decreases in the individual sensor values, the variance $s^2$ is always divided by a proportional value. In the present case, using the average solar radiation received by the individual sensors can be said to "normalize" the calculated $s_{modified}$ deviation of the sensors. (Consequently, only one arbitrary light requirement, i.e., the difference between daylight and nighttime, is needed for all lighting conditions.) The aforementioned target, or threshold, value is an arbitrarily set value corresponding to $s_{modified}$ which, by definition, represents the bare minimum of received light sufficient to acquire the sun by the light source tracker system of the present invention. The calculated modified deviation $s_{modified}$ is compared to the preset target value, and if the modified deviation exceeds the target value, the system proceeds as if the sun has been acquired by the light source tracker of the present invention.

When the three sensor values are significantly dissimilar, $s_{modified}$ will be a large number. If all three of the sensors values are equal, $s_{modified}$ will go to 0. If all three sensors are directly illuminated by the sun, their values are essentially equal. If one sensor becomes shaded, $s_{modified}$ becomes significantly larger. Consequently, if $s_{modified}$ is low in value and below the arbitrarily set target value, the light source tracker has targeted the sun. If $s_{modified}$ is above the arbitrarily set target value, the light source tracker has not, at that instant, acquired the target. Each sun sensing cycle involves calculating the average of the solar radiation values in watts/m$^2$ received by the three sensors, the variance $s^2$ and the modified deviation $s_{modified}$, and comparing the modified deviation value with the preset target value in determining whether the light source tracker has acquired the sun. The modified deviation $s_{modified}$ operates in the following manner. Over the course of one minute, the sun will move approximately ¼° relative to an observer on the surface of the earth. This will result in shading of one or two of the three light sensors used in the present invention. As soon as one light sensor is shaded, $s_{modified}$ increases in value dramatically because the difference between the amount of light received by that sensor is substantially different from the average sensor value. The difference in the amount of light received by the individual light sensors gives rise to a dramatic increase in $s_{modified}$.

Each of the sensor values is compared with the average sensor value. If a sensor value is less than average, the actuator associated with that sensor retracts for the purpose of increasing that sensor's exposure to the sun and its light sensed value. This occurs independently for each of the plural sensor and actuator combinations. If the sensor value is below the average sensor value, then its associated actuator retracts and the sensor is displaced away from darkness and toward the sun. Thus, the system compares the measured level of light intensity received by each light sensor with the average level of light intensity received by all of the light sensors and the array of sensors is moved by either extending an actuator associated with a sensor if the light received by that sensor is greater than the average level of light intensity received by all of the light sensors or retracting an actuator associated a light sensor if the light received by that sensor is less than the average level of light intensity received by all of the light sensors.

Once the work cycle has begun and the modified deviation has been calculated at step 108, the program proceeds to step 110 to check the dither quantity. The dither quantity is a measure of the vacillation, or change, in direction of the light source tracker as it attempts to acquire the sun. Each $\frac{1}{10}^{th}$ second sensor cycle may or may not include a change in direction of the light source tracker. If at step 110, the number of counted dither movements exceeds three, the work cycle is stopped, the work cycle timer is reset, and the program branches to step 100 to restart the global timer.

If at step 110, it is determined that the dither quantity does not exceed three, the program proceeds to one of several next steps in the program depending upon light sensed values. The program determines the current lighting condition in terms of various conditions such as nighttime, dawn or dusk, and daytime. These conditions are determined, or sensed, by comparing the modified deviation value with predetermined values corresponding to each of the aforementioned lighting conditions.

Once the controller detects a significant variation in sensor values, the light source tracker will seek an orientation which provides increased receipt of light from the sun by each of the sensors. This movement is performed in a step-wise manner wherein the sensor array will move in a dithering manner with the sensor array closely aligned with, but not precisely targeted on the sun. At step 110, the number of sensor actuator changes for all of the sensors is counted. Thus, the extension, retraction or stoppage of movement of all of the sensor actuators is counted, and if this number is less than 4, the light source tracker determines that it has acquired the sun.

If it is determined that the average value of the sensors is below a predetermined nighttime threshold value, the program proceeds to step 112 and verifies in step 114 that nighttime atmospheric conditions prevail. Upon confirmation that it is nighttime, the program then proceeds to step 116 and terminates the sun acquisition routine and proceeds to step 110 and restarts the global timer for initiating another work cycle, which process continues until light is detected with the rising or reappearance of the sun.

If it is determined that the average sensor value is above the predetermined nighttime threshold value, but below a predetermined daytime threshold value, the program proceeds to step 118. In this condition, the sensors cannot determine whether it is nighttime or daytime. The program then proceeds to step 120 to determine the existing atmospheric conditions in terms of whether it is dawn or dusk and whether it is clear or cloudy. If it is determined that the current light level is below the threshold daytime light level, the program then proceeds to step 122 for preparing for the next appearance of sun light by retracting all sensor actuators. All of the light sensors are then aligned in a generally horizontal array to facilitate sensing and detection of the next appearance of sun light such as at sunrise. If the work cycle timer has completed its cycle as determined at step 126, operation of the light source tracker is terminated and the program returns to step 100 for restarting the global timer. If at step 124 it is determined that the work cycle timer has not yet finished, the program returns to step 108 for again reading the sensor values and calculating the modified deviation.

Thus, the light sensors are moved in the direction of the light source while the system compares the standard deviation value of the received light intensity with the assigned threshold value of the light source until the standard deviation is less than the threshold value, whereupon the light source has been acquired by the light sensors. The light sensors are moved in a stepwise, incremental manner in the direction of the light source. The number of steps is limited to a predetermined number. The standard deviation value of the received light intensity received from the light source is again determined if the standard deviation value is not less than the threshold value within the aforementioned predetermined number of steps.

If at step 110 it is determined that the dither quantity is less than 4 and that the average sensor value is above a predetermined daytime threshold, the program proceeds to step 128. The system is then prepared to operate within a range of light conditions which the system considers to be daylight. The system then proceeds to step 130 to detect the available light level in terms of various atmospheric conditions. For example, the available light level may vary depending on whether it is sunny and clear for maximum daylight, or partly sunny with patchy thick clouds for reduced available sunlight. Conditions such as cloudy and sunny with slight haze as well as various other atmospheric conditions will result in reduced available sunlight as detected by the light source tracker. The program then proceeds to step 132 if it is determined that the modified deviation is above the target value. If so, the program proceeds to step 134 and shuts down the light source tracker and returns to step 100 for restarting the global timer. After considering the various atmospheric conditions, the program proceeds to step 136 if it is determined that the modified deviation is below the target value and then proceeds to step 138 for controlling the actuators of the light sensors to acquire the sun. Thus, for each actuator, if its associated sensor value is below the average sensor array value, its actuator will retract. If the sensor value is above the average sensor value, the controller extends the associated actuator of that sensor. If it is determined at step 138 that the sensor value is equal to the average sensor value, the program stops any further movement of that actuator and its associated sensor. The program then proceeds to step 140 for executing a dither count wherein the number of actuator directional changes for each actuator and the dither count is incremented by 1 for each such directional change. Each actuator can change its state in six ways. Each actuator can extend/stop extending, retract/stop retracting, and stop/go "move", and any combination thereof. Each such change in state will result in an incrementing of the dither count by 1.

The program then proceeds to step 144 to determine if the work cycle timer has timed out at 10 seconds. The program will then branch to step 100 if the work cycle timer is finished for the purpose of restarting the global timer. If it is determined at step 142 that the work cycle timer has not finished, the program then branches to step 108 for again reading the sensor values.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustrated only and not as a limitation. The actual scope of the invention is intended to be defined in the following claims when viewed in their proper perspective based on the prior art.

The invention claimed is:

1. A method for detecting and acquiring a light source using an array of movable light sensors, said method comprising the steps of:
    assigning a threshold value to the light source representing a predetermined level of light intensity emitted by the light source;
    determining a standard deviation value of the measured level of light intensity received by the movable light sensors from the light source;
    moving the light sensors in the direction of the light source while comparing the standard deviation value of the received light intensity with the assigned threshold value of the light source until the standard deviation value is less than said threshold value, whereupon said light source is acquired by the light sensors, wherein the light sensors are moved in a stepwise, incremental manner in the direction of the light source, and wherein the number of steps is limited to a predetermined number, with the standard deviation value of the measured level of light received from the light source again determined if the standard deviation value is not less than the threshold value within said predetermined number of steps; and
    tracking the light source if the standard deviation value is less than the threshold value within said predetermined number of steps of movement of the array of light sensors.

2. The method of claim 1 further comprising the step of comparing the level of light intensity received by the movable light sensors from the light source with a threshold level of light intensity representing daylight and then determining a standard deviation of the light intensity received by the movable light sensors if the level of light intensity received exceeds said reference level of light intensity.

3. The method of claim 1 wherein the step of comparing the standard deviation value of the received light intensity with the assigned threshold value of the light source includes the step of determining the contrast in the light intensity received by each of the individual light sensors to determine the direction of initial movement of the array of movable light sensors toward the light source.

4. The method of claim 1 further comprising the step of returning to the step of determining a standard deviation of the value of the measured level of light received by the light sensors if the number of incremental steps of the movable light sensors exceeds said predetermined number of steps in acquiring the light source.

5. The method of claim 3, wherein said predetermined number of steps is three or less.

6. The method of claim 1 further comprising the steps of:
    comparing the measured level of light intensity received by each light sensor with the average level of light intensity received by all of the light sensors and moving the array of light sensors by either extending an actuator associated with a light sensor if the light received by that sensor is greater than the average level of light intensity received by all of the light sensors or retracting an actuator associated with a light sensor if the light received by that sensor is less than the average level of light intensity received by all of the light sensors;
    incrementing the number of steps in the movement of the array of light sensors; and
    determining an updated standard deviation for comparison with the assigned threshold value of the light source until the updated standard deviation is less than said threshold value.

7. The method of claim 1, wherein the step of determining the standard deviation value of the level of light intensity received by the movable light sensors further includes determining the variance value of the light intensity received by the movable light sensors and dividing said variance value by the average light intensity received by said movable light sensors to provide a modified deviation value of the level of light intensity received by the movable light sensors and using said modified deviation in subsequent steps of the method for detecting and acquiring a light source using an array of movable light sensors.

8. The method of claim 1 further comprising the steps of carrying out additional incremental steps of movement of said movable light sensors after the light source is acquired and determining an updated standard deviation value of the light received by the light sensors in tracking the light source.

* * * * *